July 23, 1946.  J. M. HAIT  2,404,491
AMPHIBIAN STEERING MECHANISM
Filed Feb. 15, 1943  2 Sheets-Sheet 1
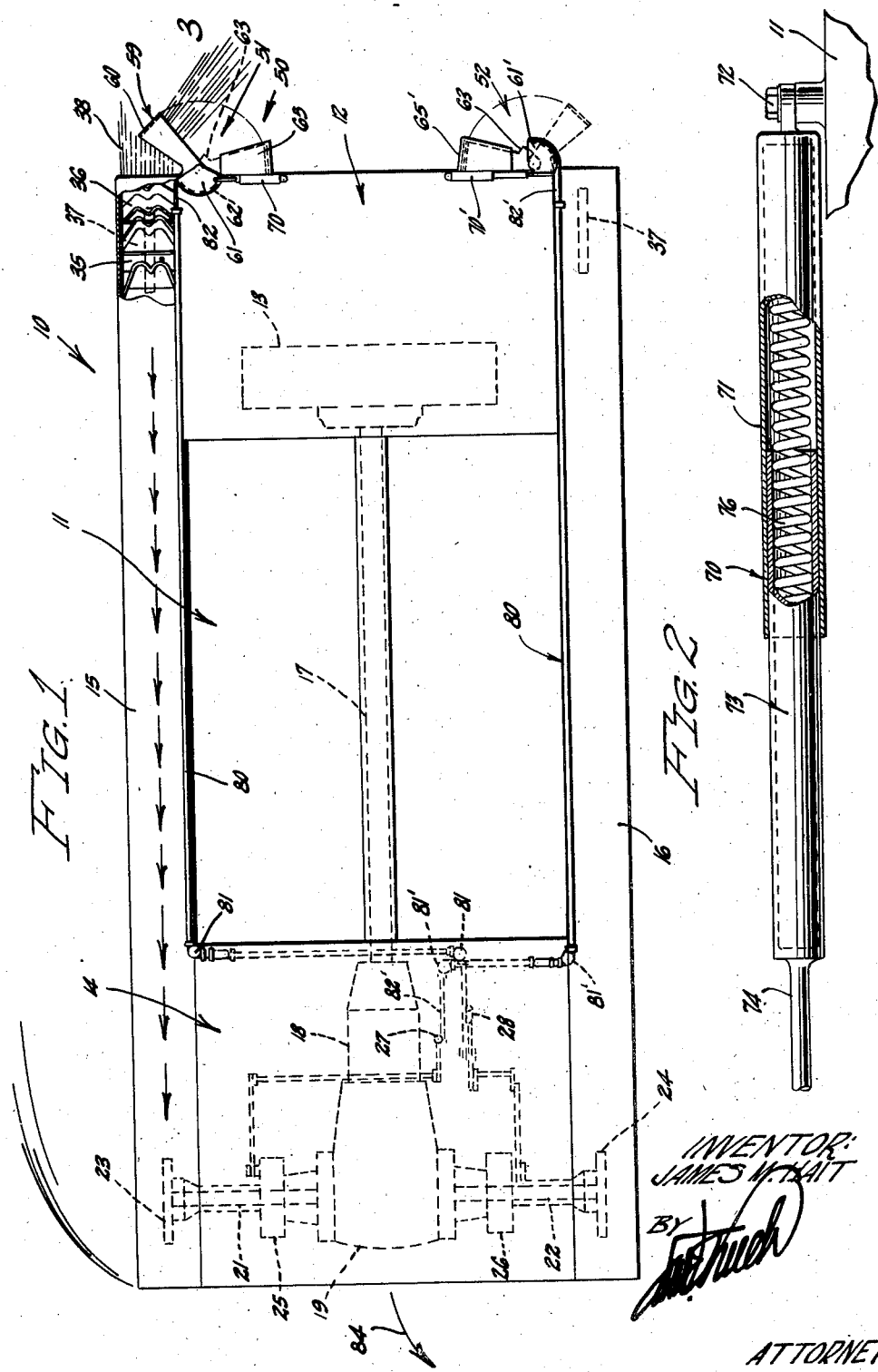
INVENTOR:
JAMES M. HAIT
BY
ATTORNEY

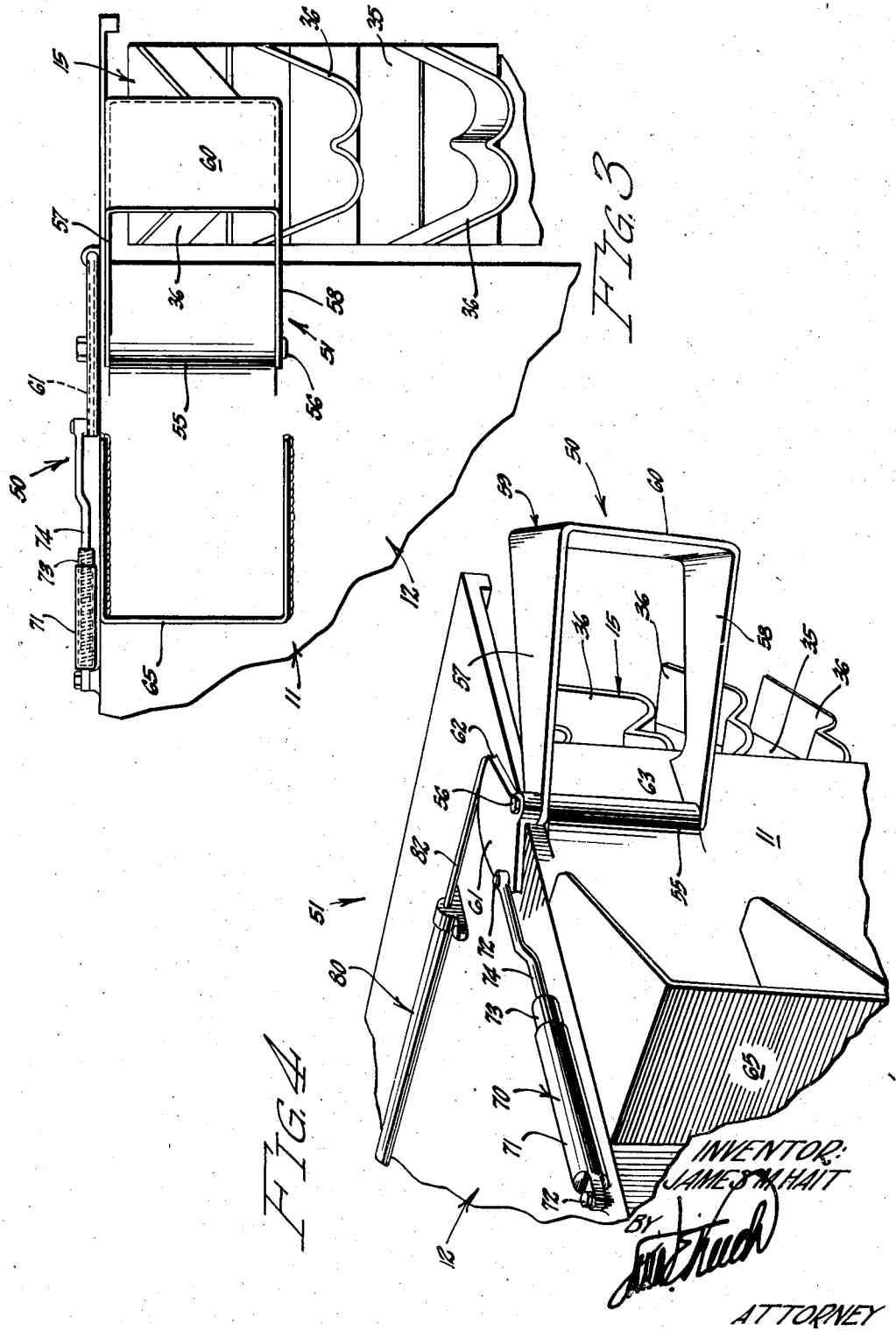

Patented July 23, 1946

2,404,491

UNITED STATES PATENT OFFICE 2,404,491

AMPHIBIAN STEERING MECHANISM

James M. Hait, San Gabriel, Calif., assignor to Food Machinery Corporation, San Jose, Calif., a corporation of Delaware Application February 15, 1943, Serial No. 475,931

7 Claims. (Cl. 115—1)

This invention relates to the art of steering water craft and is especially useful on amphibians employed in naval warfare.

It is an object of the invention to provide a relatively simple means for rendering an amphibian of this type readily dirigible in water.

Much of the traveling of these amphibians in the water is at a low speed, yet it is desirable that these craft have a relatively high degree of maneuverability in the water, regardless of their speeds.

It is accordingly another object of my invention to provide a steering mechanism for amphibians which is not dependent upon the forward speed of the amphibian through the water for steering the latter.

Amphibians used in naval warfare frequently must travel on land through a dense jungle, and must even be run backwards in the midst of a heavy growth of medium sized trees.

It is still another object of my invention to provide a steering mechanism rendering amphibians readily dirigible on water and which will be relatively inaccessible to damage by such land operations.

An amphibian in current use of the type mentioned is operated by means of track-laying traction belts disposed on opposite sides of the craft, which are adapted to be selectively driven by the power plant to maneuver the craft on land and assist in maneuvering it on water.

It is an object of my invention to provide a mechanism for rendering amphibians readily dirigible, which is operated by the same control devices through which the traction belts on the amphibian are selectively controlled and without the necessity of special thought being given to the steering mechanism.

The manner of accomplishing the foregoing objects, as well as further objects and advantages, will be made manifest in the following description taken in connection with the accompanying drawings, in which:

Fig. 1 is a diagrammatic plan view of an amphibian equipped with a preferred embodiment of the present invention, said amphibian being shown when said invention is functioning to assist said amphibian in turning to the left.

Fig. 2 is an enlarged detail view partly broken away and illustrating the telescopic spring mounting utilized in said invention.

Fig. 3 is an enlarged fragmentary rear elevational view of a portion of Fig. 1, to illustrate the right-hand deflector of my invention in operative position.

Fig. 4 is a perspective view of the mechanism shown in Fig. 3 and with the operating parts similarly positioned.

Referring specifically to the drawings, an amphibian 10 is shown therein which has a hull 11 providing an engine compartment 12, in which a radial engine 13 is housed, a control cabin 14 being located at the front end of the craft. Disposed along opposite sides of the hull are tracklaying mechanisms 15 and 16, these being driven by the engine 13 through a drive shaft 17, transmission 18, differential 19, shafts 21 and 22, and sprockets 23 and 24. Shafts 21 and 22 are provided with brakes 25 and 26 which are controlled respectively by hand levers 27 and 28, provided in the control cabin 14. Thus, pulling on the lever 27 applies the brake 25 to retard the operation of the track-laying mechanism 15 and to cause mechanism 16 to operate with increased speed. On the other hand, releasing lever 27 and pulling on lever 28 has the opposite effect.

As shown in Figs. 1, 3 and 4, each of the mechanisms 15 and 16 has a track-forming belt 35 which is provided with an endless series of grouser blades 36, these belts traveling upwardly around idler sprockets 37 at the stern of the craft. As the grouser blades 36 come out of the water in which the amphibian 10 is floating, they create streams of water 38, one of these being discharged rearwardly through the air at all times from each of the mechanisms 15 and 16 while it is operating at medium or high forward speeds. The creation of such a stream of water 38 by either of the mechanisms 15 or 16 takes place whenever one of these mechanisms is set in operation as stated, with the craft afloat, and regardless of whether the amphibian 10 is standing still, or whether it is under way at slow speed, or is traveling more rapidly.

The amphibian 10 is equipped with a steering mechanism 50 which includes control units 51 and 52, and means for connecting these to levers 27 and 28. The units 51 and 52 are reverse duplicates of each other. A description of unit 51 will therefore suffice for both, reference thereafter to elements of unit 52 being made by using reference numerals applied to corresponding elements in unit 51, with prime attached.

Unit 51 includes a boss 55, through which a pin 56 extends on which are pivotally mounted upper and lower arms 57 and 58 of a swinging member 59. The latter also includes a deflector 60 which rigidly unites the outer ends of the arms 57 and 58. Formed on the arm 57 about the upper end of the pin 56, and integral with said arm, is a control segment 61 having a groove 62 formed in the arcuate edge thereof.

The arm 58 has a stop shoulder 63 which limits the outward swinging movement of the control member 59. Fixed as by welding on the rear end of the hull 11 is a shelter box 65 into which the member 59 fits when it is swung inwardly about the pin 56.

The unit 51 also includes a telescopic spring mechanism 70 including an outer shell 71 pivoted on a bolt 72 on the hull 11, a tube 73 sliding within the tube 71 and having a rod 74 which is pivotally connected to the segment 61. Enclosed within the tubes 71 and 73 is a coiled expansion spring 76 which, when unopposed, swings the member 59 about the pin 56 until this member lies within the shelter box 65.

Secured to the hull 11 is a system of cable guiding tubes 80 having pulleys 81 at their joints guiding a cable 82, the rear end of which is fastened to the segment 61 at the rear end of the groove 62 and the forward end of which is fastened to the bottom end of the lever 28 below the fulcrum of the latter. This cable is thus connected so that when the operator pulls upon the lever 28 to apply the brake 26 and retard the operation of the track-laying mechanism 16 (which causes an acceleration of the rate of operation of the track-laying mechanism 15) cable 82 is caused to pull upon the member 59 to swing the deflector blade 60 into the stream of water 38 being produced by the track-laying mechanism 15, as clearly shown in Figs. 1, 3 and 4.

When this occurs, the reaction of the stream 38 striking the blade 60 of the member 59 sets up a side thrust outwardly on the rear end of the hull 11, which assists in turning the amphibian 10 to the left as indicated by arrow 84. As soon as the operator releases control lever 28, however, to permit both mechanisms 15 and 16 to be driven at equal rates, the pull on the cable 82 is relaxed and the spring mechanism 70 swings the member 59 inwardly to where it lies within the shelter box 65.

In the same manner, the segment 61' of the control unit 52 is connected by a cable 82' with the operating control lever 27 so that when the latter is pulled backward to apply brake 25 and retard the operation of the propuulsion mechanism 15 and accelerate the speed at which the mechanism 16 functions, member 59' will be swung outwardly into the position in which it is shown in broken lines in Fig. 1, where it will intercept the stream of water 38 then being expelled rearwardly through the air from the mechanism 16 so as to set up a side thrust against the rear end of the hull 11 and assist in turning the amphibian 10 to the right.

From the foregoing it will be seen that while traveling straight on the water the steering mechanism 50 of my invention does not interfere with the free rearward discharge of the streams 38, thereby developing the maximum forward thrust in these streams. It is furthermore clear that when the amphibian 10 is not turning, members 59 and 59' are disposed within the shelter boxes 65 and 65' so that there is little opportunity for these to become damaged. As an amphibian is seldom turned while operating in dense jungle, it is thus seen that the steering mechanism 50 of my invention is protected from damage by trees and the like when it is necessary for the amphibian 10 to operate in the midst of these.

While my invention is illustrated as used on an amphibian in which the upper grouser flights of the track-laying belts are normally and practically always disposed above the water in which the amphibian is floating, the invention may also be incorporated with and successfully used on an amphibian in which the upper grouser flights are submerged. When so used, the mechanisms 51 and 52 are normally submerged yet function to assist in steering the craft substantially the same as where they are normally above the water.

I claim:

1. In a dirigible water craft, the combination of: a hull; propulsion means provided on said hull, said means in its operation discharging a stream of water rearwardly through the air above the surface of the water sustaining said craft; and a deflector on said hull associated with said propulsion means to intercept and deflect laterally said stream of water, to assist in the steering of said craft.

2. In a dirigible water craft, the combination of: a hull; propulsion means provided on said hull, said means in its operation discharging a stream of water rearwardly through the air above the surface of the water sustaining said craft; a deflector blade mounted on said hull; and means for moving said blade into and out of said stream of water to deflect the latter laterally to assist in the steering of said craft.

3. In a dirigible water craft, the combination of: a hull; propulsion means provided on said hull, said means in its operation discharging water rearwardly; and a deflector mounted on said hull and adapted to be shifted into the path of said discharged water or out of the path of said discharged water, to assist in the steering of said craft.

4. In a dirigible water craft, the combination of: a hull; propulsion means provided on opposite sides of said hull, said means in their operation discharging streams of water rearwardly through the air above the surface of the water sustaining said craft; a pair of deflectors, one of which is mounted on said hull adjacent to each of said streams; and means for selectively operating said deflectors to extend one of these into the stream adjacent which it is mounted, to deflect said stream of water laterally and thereby assist in the steering of said craft.

5. In a dirigible water craft, the combination of: a hull; propulsion means provided on opposite sides of said hull, said means in their operation discharging streams of water rearwardly through the air above the surface of the water sustaining said craft; and means associated with said propulsion means to intercept and deflect laterally said streams of water to assist in the steering of said craft.

6. In a dirigible water craft, the combination of: a hull; propulsion means provided on opposite sides of said hull, said means in their operation discharging water rearwardly along spaced paths; controllable deflector means provided on said hull and adapted to be positioned in said paths to deflect laterally the water discharged along said paths as aforesaid, and thereby assist in the steering of said craft; means for driving said propulsion means at the same or different speeds; and means for coordinately controlling said driving means and said deflector means so that the latter deflects inwardly said water which is discharged rearwardly by the propulsion means which is traveling at the higher speed.

7. In an amphibian, the combination of: a hull adapted to support said amphibian in the water; right and left-hand track-laying belts on the opposite sides of said hull; an endless series of blades on each of said belts for engaging the water when said amphibian is afloat; power means for driving said belts to propel said amphibian through the water, said blades on said belts discharging water rearwardly along spaced paths; means for controlling the driving of said belts so that these may be driven at the same or different speeds; right and left-hand deflectors provided on said hull so that each of these is movable between a retracted position and a position in one of said paths in which said deflector will deflect inwardly the water discharged along said path; and means responsive to operation of the aforesaid control means for allowing said deflectors to be normally disposed in said retracted positions, but shifting one of said deflectors into the path of water discharged by its corresponding belt to function therein, as aforesaid, when said control means is actuated to retard the operation of the other track-laying belt.

JAMES M. HAIT.